United States Patent
Smith Singares (10) Patent No.: US 12,465,379 B2
(45) Date of Patent: Nov. 11, 2025

(54) METHOD AND DEVICE FOR PERFORMING INCISIONLESS SURGERY

(71) Applicant: Eduardo Smith Singares, Richland, WA (US)

(72) Inventor: Eduardo Smith Singares, Richland, WA (US)

( * ) Notice: Subject to any disclaimer, the term of this patent is extended or adjusted under 35 U.S.C. 154(b) by 350 days.

(21) Appl. No.: 18/139,774

(22) Filed: Apr. 26, 2023

(65) Prior Publication Data
US 2023/0338046 A1    Oct. 26, 2023

Related U.S. Application Data

(60) Provisional application No. 63/335,127, filed on Apr. 26, 2022.

(51) Int. Cl.
| | |
|---|---|
| *A61B 17/22* | (2006.01) |
| *A61B 1/00* | (2006.01) |
| *A61B 1/015* | (2006.01) |
| *A61B 1/018* | (2006.01) |
| *A61B 17/00* | (2006.01) |
| *A61B 17/221* | (2006.01) |

(52) U.S. Cl.
CPC .......... *A61B 17/22* (2013.01); *A61B 1/00085* (2013.01); *A61B 1/015* (2013.01); *A61B 1/018* (2013.01); *A61B 2017/00823* (2013.01); *A61B 2017/2212* (2013.01)

(58) Field of Classification Search
CPC ..... A61B 17/22; A61B 1/00085; A61B 1/015; A61B 1/018; A61B 2017/00823; A61B 2017/2212
See application file for complete search history.

(56) References Cited

U.S. PATENT DOCUMENTS

| 5,423,834 A | 6/1995 | Ahmed |
|---|---|---|
| 2002/0137988 A1 | 9/2002 | Shipp et al. |
| 2012/0232339 A1* | 9/2012 | Csiky ................. A61B 1/018 |
| | | 604/95.04 |

(Continued)

OTHER PUBLICATIONS

International Search Report and Written Opinion issued on Jul. 21, 2023 in corresponding International Application No. PCT/US23/20037; 7 pages.

*Primary Examiner* — Michael J Carey
(74) *Attorney, Agent, or Firm* — Plager Schack LLP; Mark H. Plager; Kara K. Verryt (57) ABSTRACT

A device for accessing and removing a vermiform appendix without the need for surgical incisions may include a double-layered endotube fitted with electroceramic baffling; an endoscope extending through the endotube; instruments fitted within the endoscope and configured to interchangeably extend through at least one tool orifice in the distal end of the endoscope; an extension disk attached to a proximal end of the endotube; a controller operatively attached to the instruments through the extension disk, the controller configured to control and drive movement of the endotube, the endoscope, and the instruments; a casing attached to a distal end of the endotube; a pneumatic extensible cone housed within the casing, the pneumatic extensible cone configured to go from an undeployed position to a deployed position; and a cecoclosure device attached to the pneumatic extensible cone.

7 Claims, 6 Drawing Sheets

(56) References Cited

U.S. PATENT DOCUMENTS

2015/0088246 A1    3/2015  Astarci et al.
2017/0290591 A1*  10/2017  Liddicoat ......... A61B 17/12013
2017/0303986 A1*  10/2017  Hancock ................ H01B 9/006
2019/0209148 A1    7/2019  Yang

* cited by examiner

METHOD AND DEVICE FOR PERFORMING INCISIONLESS SURGERY

RELATED APPLICATION

This application claims priority to provisional patent application U.S. Ser. No. 63/335,127 filed on Apr. 26, 2022, the entire contents of which is herein incorporated by reference.

BACKGROUND

The embodiments described herein relate generally to medical devices and, more particularly, to a method and device for performing incisionless surgery to, for example, remove the appendix.

Acute appendicitis (the term encompassing both the uncomplicated inflammation of the vermiform appendix and the complications derived from it, such as perforation, intra-abdominal abscesses, and peritonitis) is the most common surgical emergency in the world. Conventionally, there have only been two standard ways to perform an appendectomy: the open approach and the laparoscopic approach. Both methods are considered bona fide major operations and require a fully equipped operating room, anesthesia machine and drugs, and sterile equipment handled by a certified surgical technician. All of this generates significant costs that are then passed to the patient as surgical billing, which reaches into the tens of thousands of dollars.

In addition, both existing methods require surgical incisions beside the actual removal of the appendix to achieve both access and adequate exposure, which generate pain and short-term disability, not to mention their own complications, such as wound infections, dehiscence and ventral hernias.

Other treatment modalities include non-operative management, which leads to the possibility of perforation or disease recurrence.

Currently, there are no apparatus or technique that allows a medical practitioner to safely remove the vermiform appendix without the need for incisions anywhere in the torso and without the need for general anesthesia.

Therefore, what is needed is a device and method that allow for consistent access to the target organ, the simplified removal of the vermiform appendix without the use of incisions, which is standardized and easily taught and which results in a secure cecal closure while controlling peritoneal contamination, and obviates the need for a formal and fully staffed operating or general anesthesia.

SUMMARY

Some embodiments of the present disclosure include a

BRIEF DESCRIPTION OF THE FIGURES

The detailed description of some embodiments of the invention is made below with reference to the accompanying figures, wherein like numerals represent corresponding parts of the figures.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as an apparatus for performing incisionless surgery and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIGS. 1-10, some embodiments of the present disclosure include a device and method to access and remove the vermiform appendix, wherein the method is based on established colonoscopic techniques with the use of a specially designed platform to deploy specially designed endosurgical instruments to remove the vermiform appendix safely and without the need for surgical incisions.

More specifically, and as shown in the Figures, the device of the present disclosure comprises a double-layered endotube 14 fitted with electroceramic baffling, wherein space between a first layer and a second layer of the endotube 14 may be designated for additional channels for irrigation-suction components; an endoscope 20 extending through the endotube 14, the endoscope 20 having a distal end with at least one irrigation-suction coupled channel 24 and at least one tool orifice extending therethrough, wherein the endoscope 20 is configured to extend out of and back into a distal end of the endotube 14; instruments fitted within the endoscope 20 and configured to interchangeably extend through the at least one tool orifice in the distal end of the endoscope 20; an extension disk 22 attached to a proximal end of the endotube 14, the extension disk 22 configured to prevent the proximal end of the device from entering the patient and to receive (if needed) extension attachments; a controller 12 operatively attached to the instruments through the extension disk 22 via cables 21, the controller 12 configured to control movement of the endotube 14, the endoscope 20, and the instruments; and a casing 18 attached to a distal end of the endotube 14, the casing 18 configured to house a pneumatic extensible cone 28 configured to go from an undeployed position to a deployed position. In embodiments, the instruments may comprise, for example, an endoscopic sphincterotome 36 and an endosnare device 38. As shown in the Figures, the endoscope 20 may include a light 23 for visualization purposes. As also shown in the Figures, the cone together with the endoscopic sphincterotome 36 and the endosnare device 38 may constitute a cecoclosure device 39. In embodiments, the endosnare device 38 may be a standard electrosurgical snare device.

Figure 1:
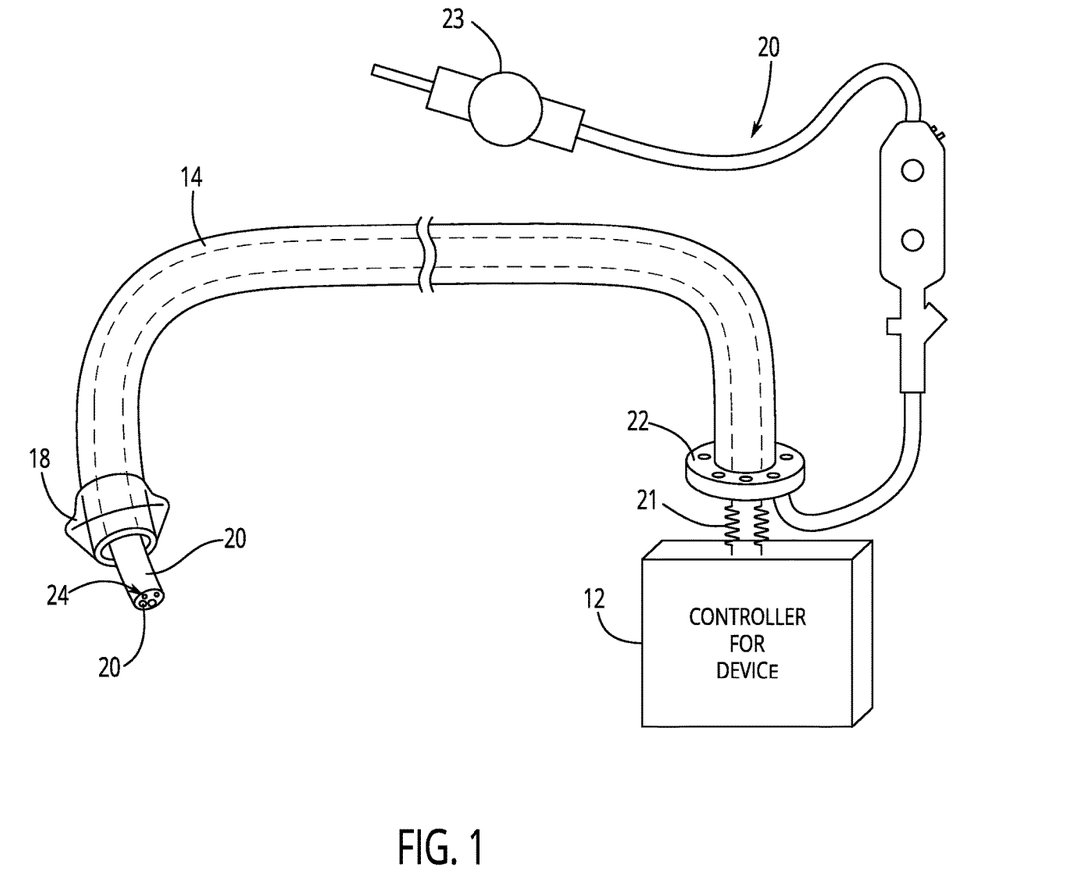
FIG. 1 is a side perspective view of one embodiment of the present disclosure.

As mentioned above, the endotube 14 may be a double-layered endotube comprising an elongate flexible endotube with an inner tube and an outer tube. In some embodiments, the endotube 14 may comprise medical-grade silicone. The endotube 14 may comprise a distal end and a proximal end, wherein the distal end is designed to be inserted into a patient's anus 26D, and the proximal end is operatively attached to the extension disk 22. The endotube may be fitted with electroceramic baffling and corresponding cables 21 that are operatively attached to the controller 12, wherein the baffling is designed to respond to electroceramic configuration changes. The baffling may comprise a plurality of cells that create a scale-like skin on the endotube 14, wherein the cells are engineered to be contained within the double-layered space and may comprise ceramic with piezoelectric properties that, under pressure, such as that from a scope trying to bend the material, may generate electrical currents that are then directed toward the controller 12, or microprocessor. The controller 12 may then generate an additional electric current that changes the structural properties of a cell or a group of cells from the baffling (i.e., the shape and deformation coefficients) resulting in conformational changes to the device, which may assist in advancing the device and prevent scope related injuries. As shown in FIG. 1, an undeployed pneumatic extensible cone 28 may be housed within a casing 18 that may be attached to an outer surface of the endotube 14 proximal to the distal end thereof.

As described above and as shown in the Figures, the cone 28 may be configured to transform from an undeployed pneumatic extensible cone housed within a casing 18 to a deployed pneumatic extensible cone and back to an undeployed pneumatic extensible cone, wherein, when deployed, the cone 28 extends from and opens away from the distal end of the endotube 14. The cone may be made of a flexible material, such as medical grade silicone, medical grade rubber, or a non-allergenic medical grade material, wherein the cone may be engineered to be folded in an accordion pattern that, upon insufflation, may deploy the cone, which contains, encased in its outer rim, a cecoclosure device 39. Removing the insufflation may retract the cone to its initial state, wherein insufflation may be driven from the controller 12 to a sufficient number of PSIs to provide rigidity to the cone, and the insufflation may reach the cone through a dedicated channel within the endotube. The outer rim of the cone may act as a casing and container for the cecoclosure device 39. In some embodiments, the cecoclosure device 39 may comprise a synthetic, medical degree plastic device with a rack and pin, similar to a chain and ball, mechanism that allows for precise and controlled cinching such that it closes an intestinal opening in a manner similar to a drawstring. The cecoclosure device 39 may also contain design elements that imbibe themselves in the intestinal walls to avoid slipping of the closure when tension is applied.

Figure 7:
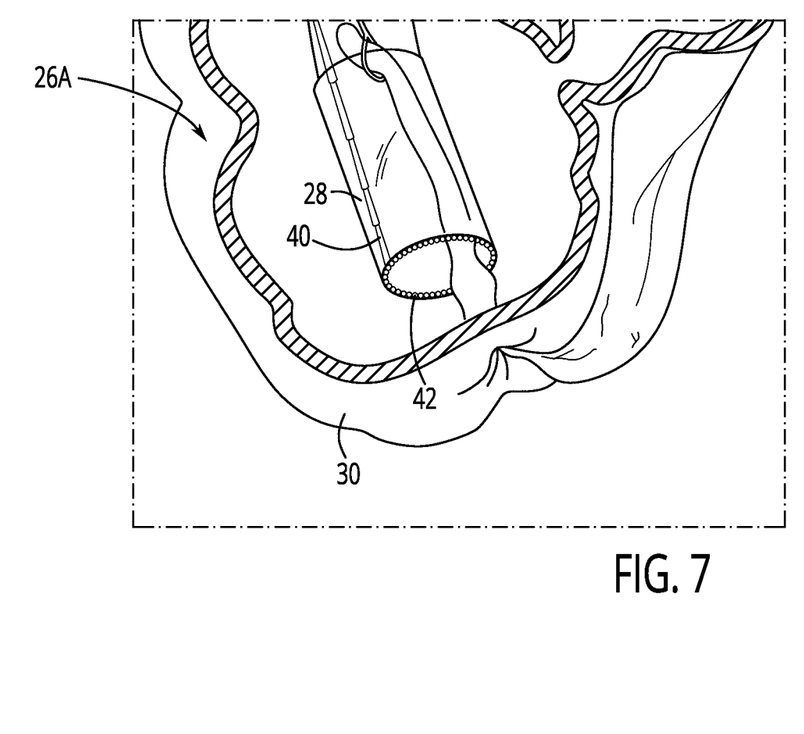
FIG. 7 is an enlarged, detail perspective view of one embodiment of the present disclosure, showing an intermediate step in the employment of the device.
Figure 8:
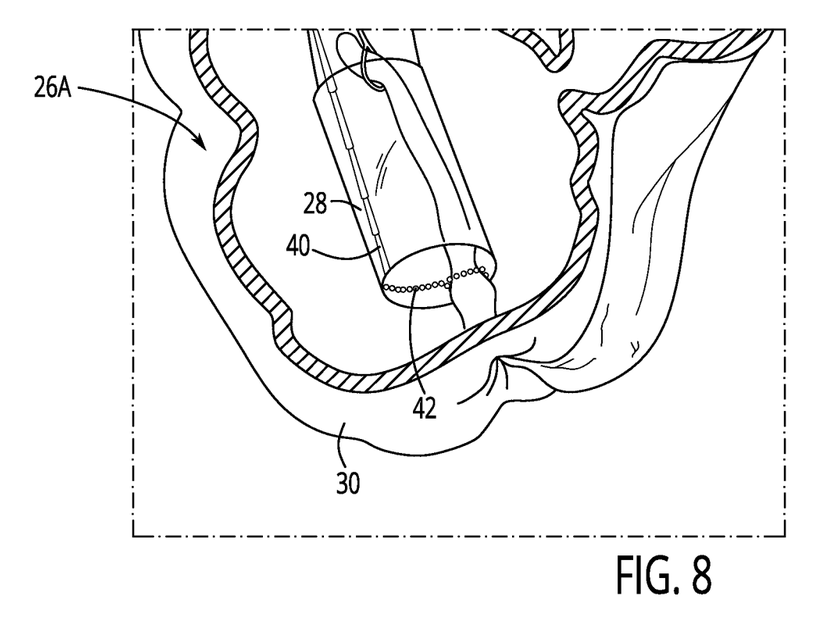
FIG. 8 is an enlarged, detail perspective view of one embodiment of the present disclosure, showing an intermediate step in the employment of the device.
Figure 9:
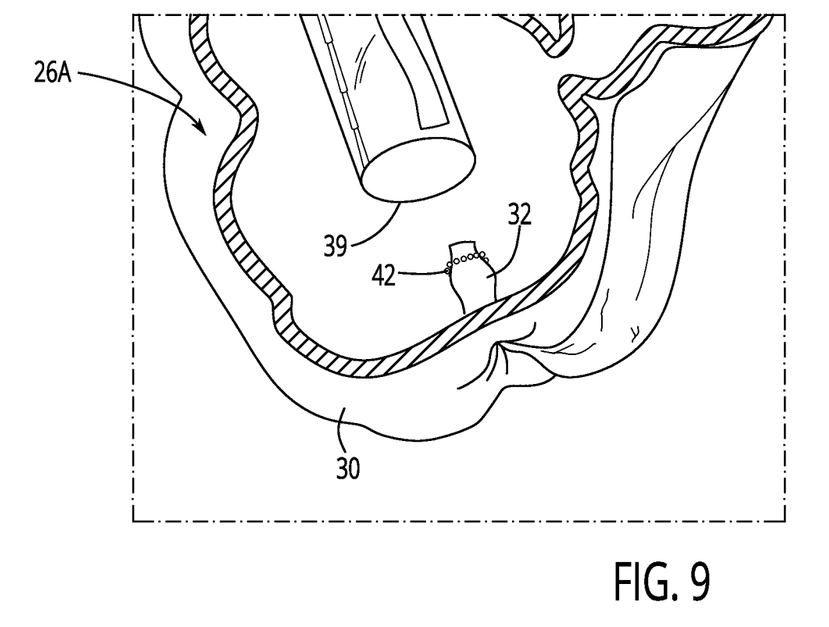
FIG. 9 is an enlarged, detail perspective view of one embodiment of the present disclosure, showing a final step in the employment of the device.
Figure 10:
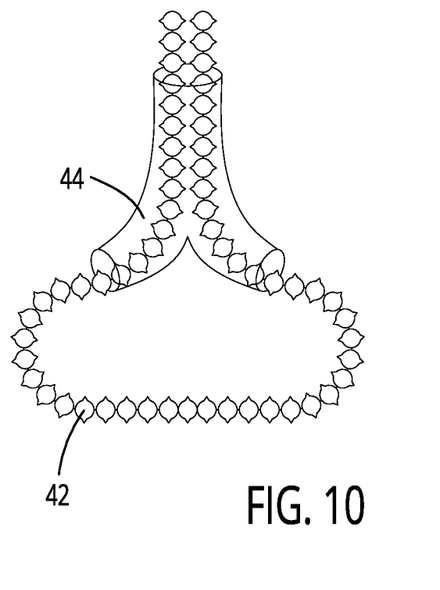
FIG. 10 is an enlarged, detail perspective view of the cecoclosure device.

More specifically, and as shown in FIGS. 7-9, the cecoclosure device 39 may comprise a telescoping arm 40 configured to extend outwards from the casing 18, wherein extension of the telescoping arm 40 may cause the extensible cone 28 to deploy. The telescoping arm 40 may be configured to articulate to raise at between about 0 and about 30 degrees from the endotube main axis. The telescoping arm 40 may hold the bead chain 42 (described more below), the clasp (described more below), and the snare. The outer rim of the extensible cone 28 may have a cord-like structure, such as a bead chain 42 attached thereto. The bead chain 42 may be made of, for example, medical degree plastic, and may be engineered to possess small protrusions designed to lay abutted against and to increase friction between the mucosa of the large intestine and the cecoclosure device 39. As shown in FIG. 9, the bead chain 42 may be a loop, wherein a clasp 44 may be engineered to channel the two ends of the loop of bead chain 42 and to be closed over the ends of the loop, securely closing them within the clasp 44. The clasp 44 may be fashioned in a triangular shape with the base directed toward the bowel, engineered with similar small protrusions designed to lay abutted against and to increase friction between the mucosa of the large intestine and the cecoclosure device 39.

In embodiments, and as described above, an endoscope 20 may extend through the endotube 14. The endoscope 20 may have a distal end and a proximal end, wherein a distal end may comprise a plurality of orifices extending therethrough, and the proximal end may have a light 23 operatively attached thereto, such that when the light 23 is activated, it shines through the length of the tube and out of the distal end of the endotube 14, thus providing for visualization. The endoscope 20 may house a plurality of instruments therein, wherein the instruments are configured to removably extend through at least one of the orifices in the end of the endoscope 20. In embodiments, the instruments may comprise, for example, an endoscopic sphincterotome 36, an endosnare device 38, a bow electroknife, a needle electroknife, and the like, wherein extension of each of the instruments may controlled by the controller 12. Each of the instruments may be operatively attached to the controller 12 such that movement of the instruments may be controlled using the controller 12.

As shown in the Figures, the extension disk 22 may be a disk shaped member attached to a proximal end of the endotube 14, wherein the extension disk 22 has an outer diameter larger than that of the endotube 14 and an inner diameter that matches the outer diameter of the endotube 14, such that the proximal end of the endotube 14 is secured therein. The extension disk 22 may contain the intake for the irrigation channel, an attachment for the suction channel, a microprocessor connected to the wiring coming to and from the baffling, and electronic connections to the cables to and from the controller 12. As mentioned above, it may also be designed to prevent the proximal end of the device from entering the patient and to receive, if needed, extension attachments.

As mentioned above, the device of the present disclosure may include or be operatively attached to a controller, such as a computer, wherein the controller may contain software that is designed to drive and control the endotube and instruments.

Figure 2:
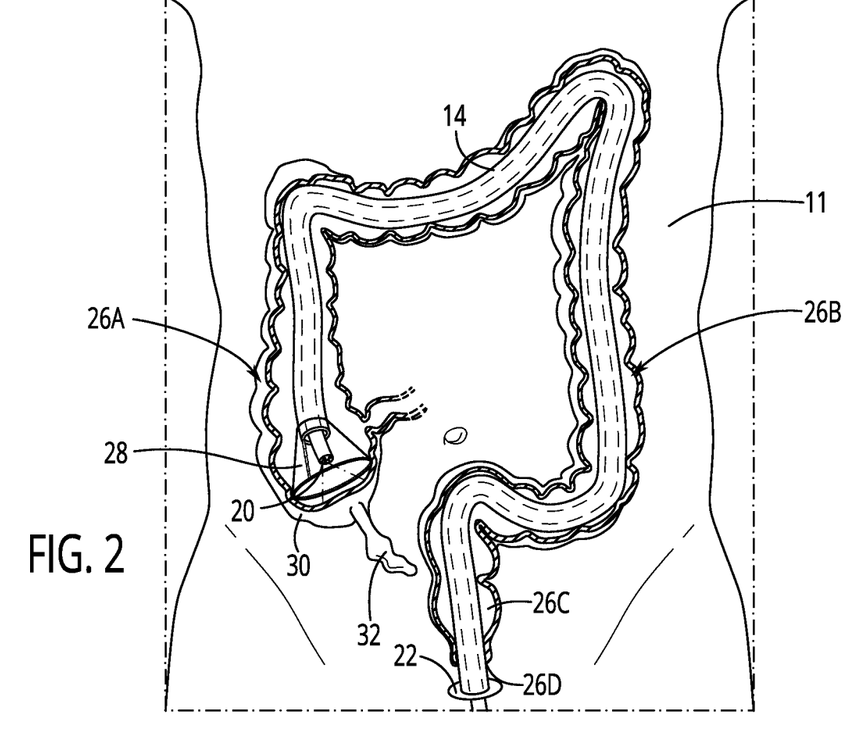
FIG. 2 is a side perspective view of one embodiment of the present disclosure, with parts shown in cross-section
Figure 3:
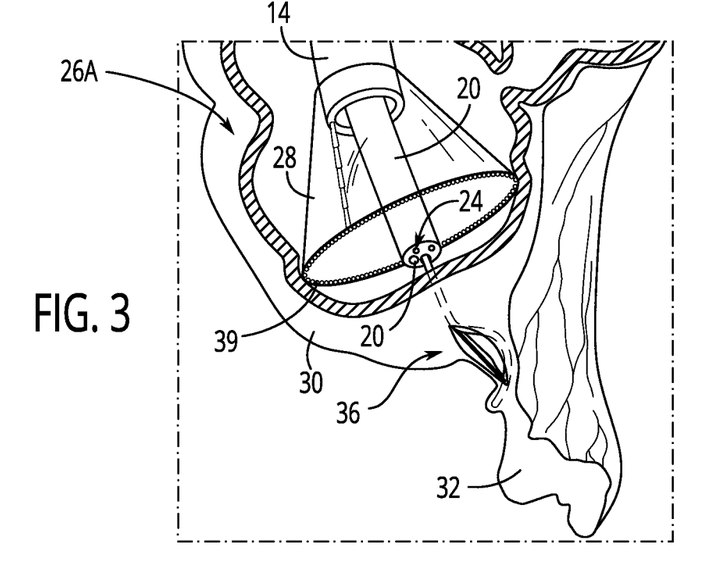
FIG. 3 is an enlarged, detail perspective view of one embodiment of the present disclosure, with parts shown in cross-section, showing a first step in the employment of the device.
Figure 4:
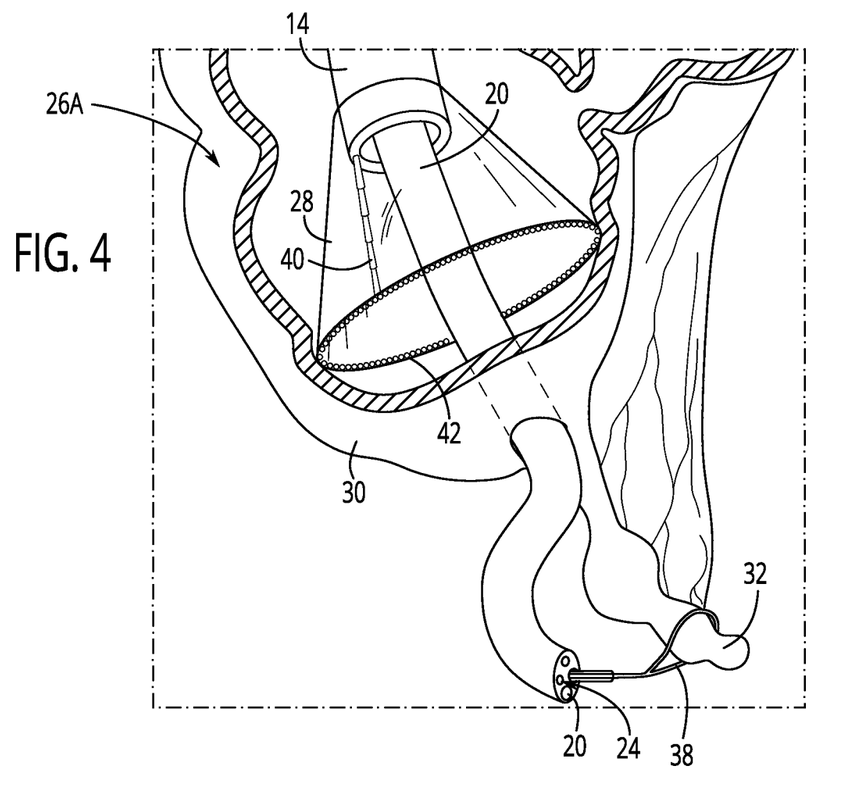
FIG. 4 is an enlarged, detail perspective view of one embodiment of the present disclosure, showing an intermediate step in the employment of the device.
Figure 5:
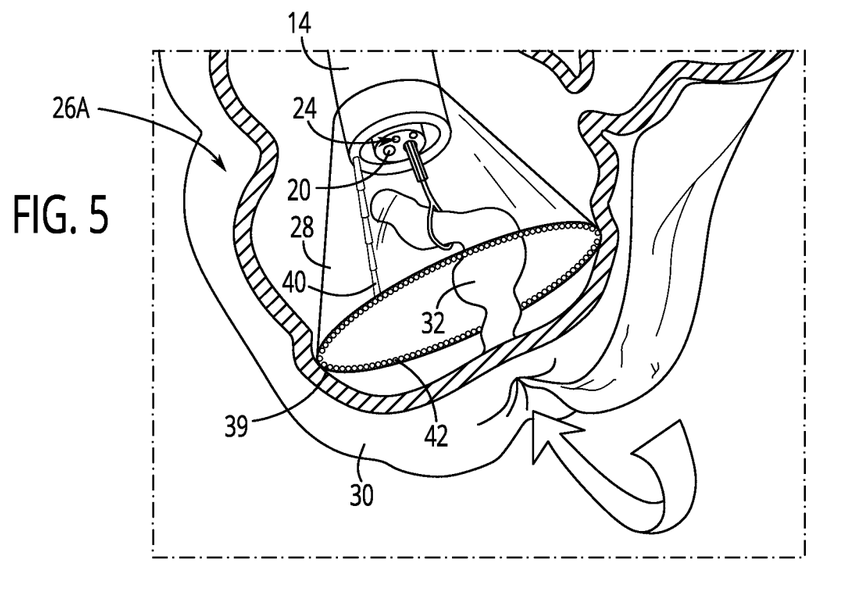
FIG. 5 is an enlarged, detail perspective view of one embodiment of the present disclosure, showing an intermediate step in the employment of the device.
Figure 6:
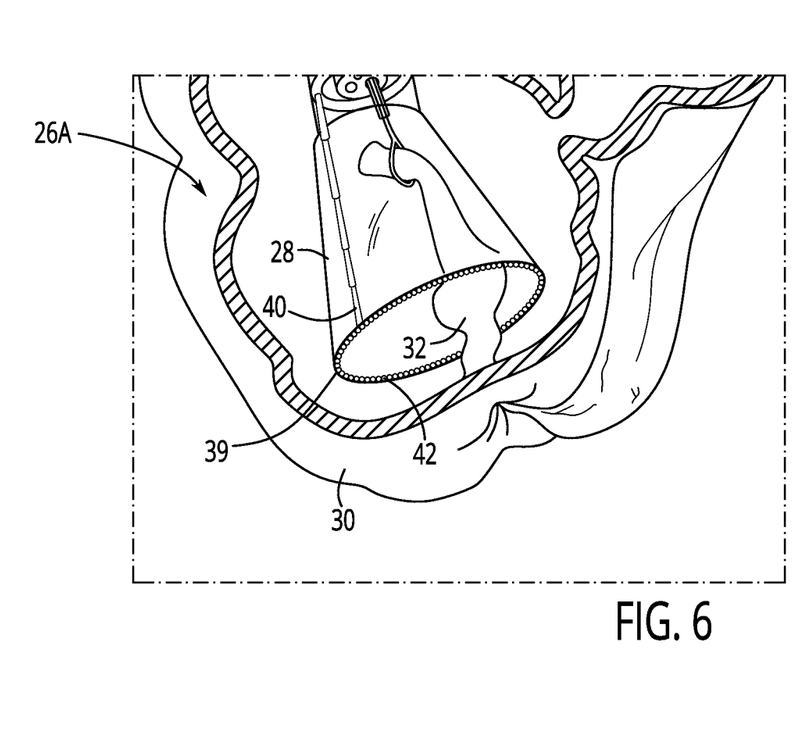
FIG. 6 is an enlarged, detail perspective view of one embodiment of the present disclosure, showing an intermediate step in the employment of the device.

To use the device of the present disclosure, a surgeon or gastroenterologist may insert the distal end of the endotube 14 into the anus 26D of a patient under conscious sedation in an endoscopic suite and may advance the endotube 14 using both endoscopic techniques (i.e., torque, flexion, and trust) and the smart walls of the endotube 14 that respond with electroceramic configuration changes to achieve consistent progress. Copious fecal matter, when encountered, may be washed away using an on-table bowel prep channels and a solution. Once the cecum 30 is reached, the cone is deployed, the area is prepped with a surgical disinfectant to clean feces out and achieve a sterile field, and the appendiceal orifice is identified, as shown in FIG. 2. All remaining gas is then evacuated through the channels 24 in the endoscope 20, and the cecal orifice is incised (full thickness) at the opposite direction of the ileocecal valve using an endoscopic sphincterotome electroknife 36, as shown in FIG. 3. The endoscope 20 is then pushed into the peritoneal cavity, with the patient lying on his or her left side, and the vermiform appendix 32 is released from all surrounding adherences using standard techniques. The top of the vermiform appendix 32 is then secured with an endosnare device 38, as shown in FIG. 4, and the vermiform appendix 32 is translocated into the cecum 30, as shown in FIG. 5. The cecoclosure device 39 then encircles the specimen and deploys a surgical degree closure using the cecoclosure device that both releases the specimen hemostatically (with the aid of electrosurgical current) and securely closes the enterotomy. More specifically, once the appendix has been translocated to the cone, traction may be applied while countertraction is provided by the semi-rigid edge of the cone. Once the intestinal defect is located completely within the cone, the cone may be transitioned to a cylinder, as shown in FIGS. 7-9, by decreasing the angle of the cone (and the telescoping arm) from 30 degrees to 0 degrees from the axis of the endotube. Then, the bead chain may be cinched close around the defect to achieve closure. In the manual version of the device, a pistol grip may be used to cinch close, while in an automatic version of the device, the chain may be pulled from a servo in the disk. Once the closure is deemed secure, the clasp may be closed and the bead chain cut in a single fire, while the electrocautery loop may be used to divide the specimen with the use of a monopolar electrocautery applied to achieve both homeostasis and tissue division. The vermiform appendix 32 is thus removed, and the procedure is concluded.

The device and method of the present disclosure may provide for consistent access to the vermiform appendix 32 through a natural orifice of the body, the anus 26D, by traversing the length of the large intestine (i.e., the rectum 26C, the left colon 26B, the right colon 26A, and the cecum 30) using sedation techniques usually applied to routine colonoscopic procedures. In addition, once the vermiform appendix 32 is secured, it can be easily retrieved from the body without the use of or need for any incisions in the torso 11.

While the device of the present disclosure is described above as being used for appendectomies, it may also be used as a fully integrated platform for other intra-abdominal procedures with modifications in the technique required, as directed by the objectives of the endoscopic operation.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A device for accessing and removing a vermiform appendix without the need for surgical incisions, the device comprising:
    a double-layered endotube fitted with electroceramic baffling;
    an endoscope configured to extend through the endotube, the endoscope having a distal end with at least one irrigation-suction coupled channel and at least one tool orifice extending therethrough, wherein the endoscope is configured to extend out of and back into a distal end of the endotube;
    at least one instrument fitted within the endoscope and configured to interchangeably extend through the at least one tool orifice in the distal end of the endoscope, the at least one instrument being a member selected from the group consisting of an endoscopic sphincterotome, an endosnare device, a bow electroknife, a needle electroknife, and a light;
    an extension disk attached to a proximal end of the endotube;
    a controller operatively attached to the instruments through the extension disk, the controller configured to control and drive movement of the endotube, the endoscope, and the instruments;
    a casing attached to a distal end of the endotube;
    a pneumatic extensible cone housed within the casing, the pneumatic extensible cone configured to go from an undeployed position to a deployed position; and
    a cecoclosure device attached to the pneumatic extensible cone, the cecoclosure device comprising:
        a telescoping arm configured to extend outward from the casing; and
        a bead chain attached to a distal end of the telescoping arm to a rim of the pneumatic extensible cone.

2. The device of claim 1, wherein when deployed, the pneumatic extensible cone extends and opens away from the distal end of the endotube.

3. The device of claim 2, wherein the pneumatic extensible cone is configured to be folded in an accordion pattern.

4. The device of claim 1, wherein the telescoping arm is configured to articulate between about 0 and about 30 degrees with respect to a main axis of the endotube.

5. The device of claim 1, wherein the bead chain comprises a plurality of protrusions configured to, during use, lay abutted against and to increase friction between a mucosa of the large intestine and the cecoclosure device.

6. The device of claim 5, further comprising a clasp encircling ends of the bead chain, causing the bead chain to be formed into a loop.

7. A device for accessing and removing a vermiform appendix without the need for surgical incisions, the device comprising:
    a double-layered endotube fitted with electroceramic baffling;
    an endoscope configured to extend through the endotube, the endoscope having a distal end with at least one irrigation-suction coupled channel and at least one tool orifice extending therethrough, wherein the endoscope is configured to extend out of and back into a distal end of the endotube;
    at least one instrument fitted within the endoscope and configured to interchangeably extend through the at least one tool orifice in the distal end of the endoscope;

an extension disk attached to a proximal end of the endotube;
a controller operatively attached to the instruments through the extension disk, the controller configured to control and drive movement of the endotube, the endoscope, and the instruments;
a casing attached to a distal end of the endotube;
a pneumatic extensible cone housed within the casing, the pneumatic extensible cone configured to go from an undeployed position to a deployed position; and
a cecoclosure device attached to the pneumatic extensible cone, the cecoclosure device comprising:
an extendible arm configured to extend outward from the casing; and
a lasso attached to a distal end of the telescoping arm to a rim of the pneumatic extensible cone.

* * * * *